United States Patent [19]

Schechter

[11] Patent Number: 5,490,189
[45] Date of Patent: Feb. 6, 1996

[54] NUCLEAR FUEL ASSEMBLY DEBRIS FILTER

[75] Inventor: Christopher B. Schechter, Lynchburg, Va.

[73] Assignee: B&W Fuel Company, Lynchburg, Va.

[21] Appl. No.: 310,555

[22] Filed: Sep. 22, 1994

[51] Int. Cl.⁶ .................................................. G21C 19/42
[52] U.S. Cl. .......................... 376/313; 376/352; 376/440; 376/451; 376/310
[58] Field of Search .................................. 376/313, 352, 376/440, 451, 310; 976/DIG. 264; 210/459, 471

[56] References Cited

U.S. PATENT DOCUMENTS

| | | | |
|---|---|---|---|
| 4,652,425 | 3/1987 | Ferrari et al. | 376/352 |
| 4,664,880 | 5/1987 | Bryan | 376/352 |
| 4,678,627 | 7/1987 | Rylatt | 376/313 |
| 4,684,495 | 8/1987 | Wilson et al. | 376/352 |
| 4,684,496 | 8/1987 | Wilson et al. | 376/352 |
| 4,828,791 | 5/1989 | DeMario | 376/352 |
| 4,832,905 | 5/1989 | Bryan et al. | 376/352 |
| 4,900,507 | 2/1990 | Shallenberger et al. | 376/352 |
| 4,919,883 | 4/1990 | Bryan | 376/352 |
| 5,009,839 | 4/1991 | King | 376/352 |
| 5,024,807 | 6/1991 | Hatfield et al. | 376/352 |
| 5,037,605 | 8/1991 | Riordan | 376/352 |
| 5,094,802 | 3/1992 | Riordan | 376/352 |
| 5,361,287 | 11/1994 | Williamson | 376/352 |
| 5,390,221 | 2/1995 | Dix et al. | 376/352 |

*Primary Examiner*—Donald P. Walsh
*Assistant Examiner*—Meena Chelliah
*Attorney, Agent, or Firm*—Robert J. Edwards; D. Neil LaHaye

[57] ABSTRACT

A nuclear fuel assembly debris filter. Each fuel rod has a ring attached to the lower end cap. The rings are shaped and sized to define a space between the lower end cap and ring such that the space serves to trap, or filter, debris before it reaches the elevation of the fuel cladding. The rings may be circular, elliptical, or any suitable shape that provides the desired filtration effect.

2 Claims, 2 Drawing Sheets

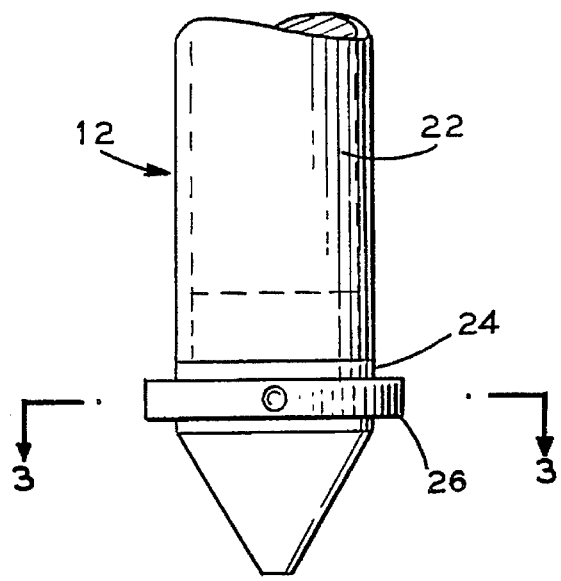
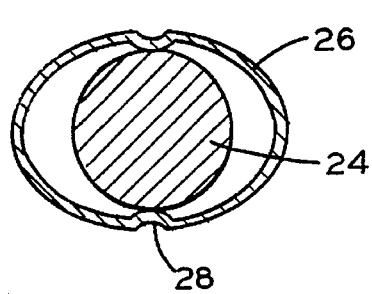
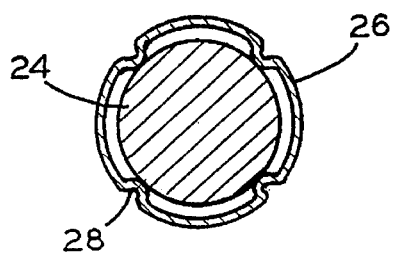
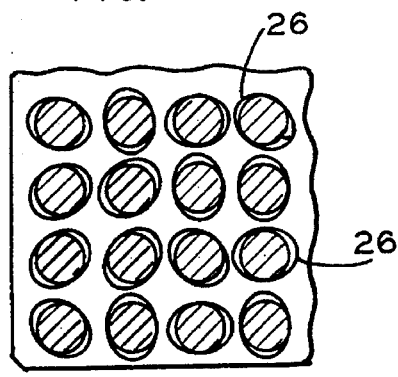
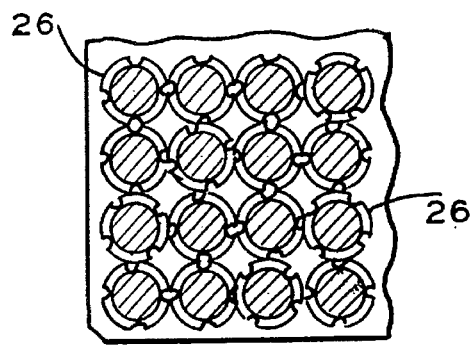

NUCLEAR FUEL ASSEMBLY DEBRIS FILTER

BACKGROUND OF THE INVENTION

1. Field of the Invention

The invention is generally related to a nuclear reactor fuel assembly and more particularly to a debris filter used with the fuel assembly.

2. General Background

Commercial nuclear reactors include multiple fuel assemblies. Each fuel assembly is comprised of a number of fuel rods radially spaced apart in a parallel array by grid assemblies spaced along the length of the fuel rods. Each grid assembly is formed in an egg crate design by multiple metal strips that criss-cross at right angles to form individual cells for each of the fuel rods. The strips are provided with tabs that project into the cells against the fuel rods. The tabs serve the purposes of holding the fuel rods in their respective radial positions and providing maximum surface area contact of the fuel rods with coolant flowing through the cells. Control rod guide thimble tubes also extend through selected cells in the grid assembly and are attached at their upper and lower ends respectively to an upper end fitting and a lower end fitting. The upper and lower end fittings are also commonly referred to in the industry as nozzle plates since they are rigid plates that provide structural integrity and load bearing support to the fuel assembly and are provided with flow apertures therethrough for coolant flow. The lower end fitting or nozzle plate is positioned directly above openings in the lower portion of the reactor where coolant flows up into the reactor to the core. The ligaments between apertures in the end fittings coincide with the ends of the fuel rods and limit upward or downward movement of the fuel rods. Debris such as metal particles, chips, and turnings is generated during manufacture, installation, and repair of the reactor, piping, and associated cooling equipment. The size and complexities of the equipment prevent location and removal of all such debris before operations are commenced. Also, some of this debris may not become loose matter in the system until the system is put into operation. It has been recognized that this debris presents a greater problem to the system than previously thought. These small pieces of debris have been found to lodge between the walls of the grid cells and the fuel elements. Movement and vibration of the lodged debris caused by coolant flow results in abrasion and removal of cladding on the fuel rods. This in turn leads to detrimental effects such as corrosion of the fuel rods and failure to retain radioactive fission gas products. Such damage, although not critical to safety of the surrounding environment, can reduce operating efficiency by the need to suspend operation while replacing damaged fuel rods. It can be seen that a need exists for a debris filter capable of filtering debris of a size which may lodge between the grid cell walls and the fuel rods. An important consideration besides that of filtration is that a substantial coolant pressure drop across the filter must be avoided in order to maintain an adequate coolant flow over the fuel rods for heat removal therefrom.

SUMMARY OF THE INVENTION

The invention addresses the above need. What is provided is a nuclear fuel assembly debris filter. Each fuel rod has a ring attached to the lower end cap. The rings are shaped and sized so as to define a space between the ring and lower end cap such that the space serves to trap, or filter, debris before it reaches the elevation of the fuel cladding. The rings may be circular, elliptical, or any suitable shape that provides the desired filtration effect.

BRIEF DESCRIPTION OF THE DRAWINGS

For a further understanding of the nature and objects of the present invention reference should be had to the following description, taken in conjunction with the accompanying drawing in which like parts are given like reference numerals, and wherein:

FIG. 2 is a side detail view of the lower end of a fuel rod with the invention attached thereto.

FIGS. 3A and 3B are views taken along lines 3—3 in FIG. 2 of alternate forms of the invention.

FIGS. 4A and 4B are top views of a section of a fuel assembly with the forms of the invention installed on the fuel rods as they correspond to FIGS. 3A and 3B.

DETAILED DESCRIPTION OF THE PREFERRED EMBODIMENT

Figure 1:
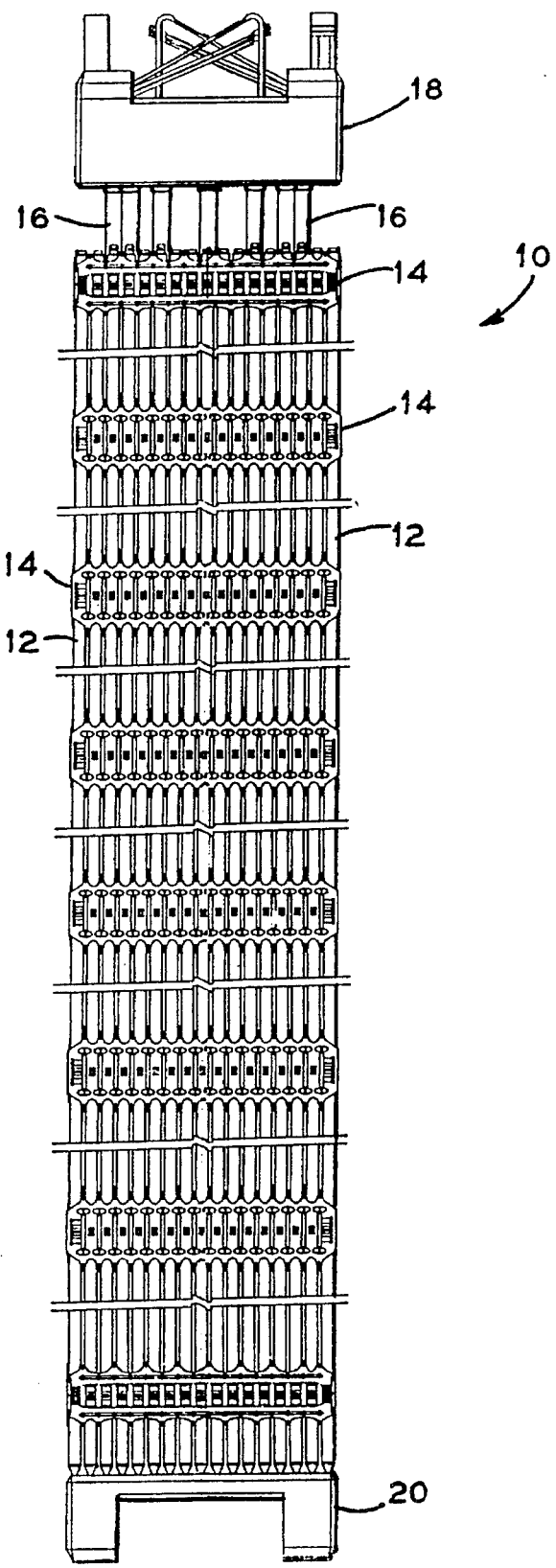
FIG. 1 is a partial sectional view of a typical fuel assembly.

Referring to the drawings, FIG. 1 is an illustration of a typical nuclear fuel assembly generally designated by the numeral 10. Fuel assembly 10 is typical of that used in a pressurized water reactor and is generally comprised of a plurality of fuel rods 12, grid assemblies 14, guide tubes 16, upper end fitting 18, and lower end fitting 20. Fuel rods 12 are maintained in an array spaced apart by grid assemblies 14. Guide tubes 16 extend through grid assemblies 14 and are attached to end fittings 18, 20 and, in addition to providing structural integrity to the entire assembly, also serve as guides for control rods not shown. Upper and lower end fittings 18, 20 provide structural and load bearing support to fuel assembly 10 and are also provided with openings therethrough to allow coolant to flow vertically through fuel assembly 10. Lower end fitting 20 rests on the lower core support plate (not shown) of the reactor and directly above coolant inlet openings in the core support plate that direct coolant upward to the fuel assembly. Dimples or tabs in the walls of the grid assemblies 14 allow maximum surface area contact of fuel rods 12 with the coolant as it flows upwardly therethrough.

FIG. 2 illustrates a detail view of the lower end of a fuel rod 12. Cladding 22 is provided around the outer circumference and along the length of fuel rod 12 as protection against corrosion. Lower end cap 24 is received in and sealed with the lower end of fuel rod 12 to prevent leakage of fission gas products. An upper end cap not shown is also commonly provided.

A ring 26 is attached to the lower end cap 24 of each fuel rod 12 in the fuel assembly by any suitable means such as one or more crimps or welds as indicated by numeral 28 in FIGS. 3A and 3B. Rings 26 are respectively illustrated in FIGS. 3A and 3B as elliptical and substantially circular but may be of any alternative shape that would provide the desired filtration function. FIGS. 4A and 4B respectively illustrate top sectional views of a portion of a fuel assembly with the rings of each type installed on the fuel rods 12. As seen in FIGS. 3A and 3B, the overall inner circumference of ring 26 is larger than the outer circumference of the lower end cap 24 to define a space between the ring 26 and lower end cap 24. The space defined between ring 26 and lower end cap 24 serves to trap, or filter, debris before it reaches the level of cladding 22. Ring 26 is formed from a material suitable for use in a nuclear reactor such as zircaloy or stainless steel. Preferably, the crimps or welds 28 are designed to have a strength great enough to withstand the thermal/hydraulic forces encountered during normal reactor operations but also allow for removal during recaging, reconstitution, or other repair procedures.

Because many varying and differing embodiments may be made within the scope of the inventive concept herein taught and because many modifications may be made in the embodiment herein detailed in accordance with the descriptive requirement of the law, it is to be understood that the details herein are to be interpreted as illustrative and not in a limiting sense.

What is claimed as invention is:

1. In a nuclear fuel assembly having a plurality of fuel rods that each have an end cap at the lower end and are held in a spaced array by grid assemblies, guide tubes extending through the grid assemblies and attached at their upper and lower ends to an upper end fitting and a lower end fitting, the end fittings having openings therethrough for coolant flow, and an elliptical debris filter, the debris filter comprising:

a ring attached to the lower end cap of each fuel rod, said ring having an inner circumference larger than the outer circumference of the lower end cap whereby a space is defined between said ring and the lower end cap.

2. In a nuclear fuel assembly having a plurality of fuel rods that each have an end cap at the lower end and are held in a spaced array by grid assemblies, guide tubes extending through the grid assemblies and attached at their upper and lower ends to an upper end fitting and a lower end fitting, the end fittings having openings therethrough for coolant flow, and a debris filter, the debris filter comprising:

a circular ring attached to the lower end cap of each fuel rod, said ring having an inner circumference larger than the outer circumference of the lower end cap whereby a space is defined between said ring and the lower end cap.

* * * * *

UNITED STATES PATENT AND TRADEMARK OFFICE
CERTIFICATE OF CORRECTION

PATENT NO. : 5,490,189

DATED : February 6, 1996

INVENTOR(S) : Christopher B. Schechter

It is certified that error appears in the above—identified patent and that said Letters Patent is hereby corrected as shown below:

Column 4, line 2, delete "an elliptical" and insert - - a - - .

Column 4, line 3, delete "a" and insert - - an elliptical - - .

Signed and Sealed this

Twenty-first Day of May, 1996

*Attest:*

BRUCE LEHMAN

*Attesting Officer*  Commissioner of Patents and Trademarks